(12) United States Patent
Barr et al.

(10) Patent No.: US 9,863,445 B2
(45) Date of Patent: Jan. 9, 2018

(54) RESERVOIR WITH DRAINING COMPARTMENT

(71) Applicant: Deere & Company, Moline, IL (US)

(72) Inventors: Micheal E. Barr, Galena, IL (US); Brian K. Kellogg, Bellevue, IA (US); Bradley A. Mann, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 810 days.

(21) Appl. No.: 14/258,083

(22) Filed: Apr. 22, 2014

(65) Prior Publication Data

US 2015/0247511 A1 Sep. 3, 2015

Related U.S. Application Data

(60) Provisional application No. 61/946,109, filed on Feb. 28, 2014.

(51) Int. Cl.
| | |
|---|---|
| *E02F 9/22* | (2006.01) |
| *F15B 1/26* | (2006.01) |
| *B60T 11/26* | (2006.01) |
| *B60T 17/06* | (2006.01) |
| *E02F 9/08* | (2006.01) |
| *F15B 21/04* | (2006.01) |

(52) U.S. Cl.
CPC .............. *F15B 1/26* (2013.01); *B60T 11/26* (2013.01); *B60T 17/06* (2013.01); *E02F 9/0883* (2013.01); *E02F 9/226* (2013.01); *E02F 9/2275* (2013.01); *F15B 21/044* (2013.01); *Y10T 137/86187* (2015.04)

(58) Field of Classification Search
CPC .. B60T 11/26; B60T 17/06; F15B 1/26; E02F 9/0883; E02F 9/226; E02F 9/2275
See application file for complete search history.

(56) References Cited

U.S. PATENT DOCUMENTS

| | | | | |
|---|---|---|---|---|
| 4,880,503 | A | * 11/1989 | Molitorisz | ................ F15B 1/26 |
| | | | | 165/128 |
| 2004/0108258 | A1* | 6/2004 | Hirasawa | ............... B01D 36/02 |
| | | | | 210/167.04 |
| 2011/0303389 | A1* | 12/2011 | Knuth | ...................... F15B 1/26 |
| | | | | 165/47 |

OTHER PUBLICATIONS

980H Wheel Loader, Parts Manual. Product brochure. Caterpillar, Mar. 2008 (5 pages).

* cited by examiner

*Primary Examiner* — Logan Kraft
*Assistant Examiner* — Abiy Teka (57) ABSTRACT

A fluid reservoir comprises a first compartment, a second compartment, a port, a drain, and a tube. The port is fluidly connected to the first compartment and positioned at a port height. The drain is fluidly connected to the first compartment and the second compartment. An entrance to the drain is positioned in the first compartment at a drain entrance height which is lower than the port height. The tube is fluidly connected to the first compartment and the second compartment. An entrance to the tube is positioned in the first compartment at a tube entrance height which is higher than the drain height.

20 Claims, 5 Drawing Sheets

RESERVOIR WITH DRAINING COMPARTMENT

FIELD OF THE DISCLOSURE

The present disclosure generally relates to a fluid reservoir comprising a draining compartment.

BACKGROUND

A fluid reservoir may be used with a number of fluids on a vehicle, such as hydraulic fluid, engine oil, engine coolant, and axle oil. Components may be fluidly connected to the fluid reservoir through lines connected to ports positioned on the fluid reservoir. Screens may be installed on these ports to collect debris carried by fluid flowing into the fluid reservoir. This debris may be composed of contaminants entering the system from an external source, such as dirt, or pieces of a component which may break free as a result of a component failure. The screens may prevent such debris from entering the fluid reservoir, circulating further with the fluid, and causing damage or impacting the performance of the vehicle. The screens may be checked regularly to remove debris, checked after a component failure in order to remove debris caused by the failure, or as part of a debris check to determine whether a component failure occurred. If the screens are submerged in fluid, the fluid reservoir may need to be drained in order to disconnect the lines from the ports and check the screens for debris. If the screens are positioned within a compartment from which fluid which may drain over time if the vehicle is not operating, the fluid reservoir may not need to be drained in order to disconnect the hydraulic lines from the ports and check the screens for debris.

SUMMARY

According to an aspect of the present disclosure, a fluid reservoir may comprise a first compartment, a second compartment, a port, a drain, and a tube. The port may be fluidly connected to the first compartment and positioned at a port height. The drain may be fluidly connected to the first compartment and the second compartment. An entrance to the drain may be positioned in the first compartment at a drain entrance height which is lower than the port height. The tube may be fluidly connected to the first compartment and the second compartment. An entrance to the tube may be positioned in the first compartment at a tube entrance height which is higher than the drain height.

According to another aspect of the present disclosure, a fluid reservoir may comprise an external wall, an internal wall, and a tube. The external wall may define a boundary between the inside and outside of the fluid reservoir and may comprise a case drain return port and a supply port. The internal wall may define a boundary between a first compartment and a second compartment. The first compartment and the second compartment may each be located within the fluid reservoir. The internal wall may be affixed to the external wall. The internal wall may comprise a drain hole. The case drain return port may be fluidly connected to the first compartment and may be positioned at a case drain return port height. The supply port may be fluidly connected to the second compartment and may be positioned at a supply port height, which is lower than the case drain return port height. An entrance to the drain hole may be positioned at a drain hole entrance height which is lower than the case drain return port height. The tube may be affixed to the internal wall and fluidly connected to the first compartment and the second compartment. An entrance to the tube may be positioned in the first compartment at a tube entrance height which is higher than the drain hole height.

According to another aspect of the present disclosure, a method of using a hydraulic reservoir may comprise connecting a case drain line from a case drain port of a hydraulic pump to a case drain return port of a first compartment of the hydraulic reservoir, connecting a supply line from a second compartment of the hydraulic reservoir to an input port of the hydraulic pump, operating the hydraulic pump until the level of hydraulic fluid in the first compartment rises above an entrance to a tube positioned in the first compartment and hydraulic fluid flows from the first compartment to the second compartment through the tube, and ceasing the operation of the hydraulic pump until sufficient hydraulic fluid flows through a drain hole interconnecting the first compartment and the second compartment such that the level of hydraulic fluid in the first compartments falls below the case drain return port.

The present disclosures may improve the serviceability of the fluid reservoir by allowing the inspection of certain ports without the need to empty fluid from the reservoir. Further, the present disclosure may reduce the aeration of fluid, and provide improved deaeration, in such a reservoir.

The above and other features will become apparent from the following description and accompanying drawings.

BRIEF DESCRIPTION OF THE DRAWINGS

The detailed description of the drawings refers to the accompanying figures in which:

FIG. 4b is an alternative embodiment to that shown in FIG. 4a.

DETAILED DESCRIPTION

Figure 1:
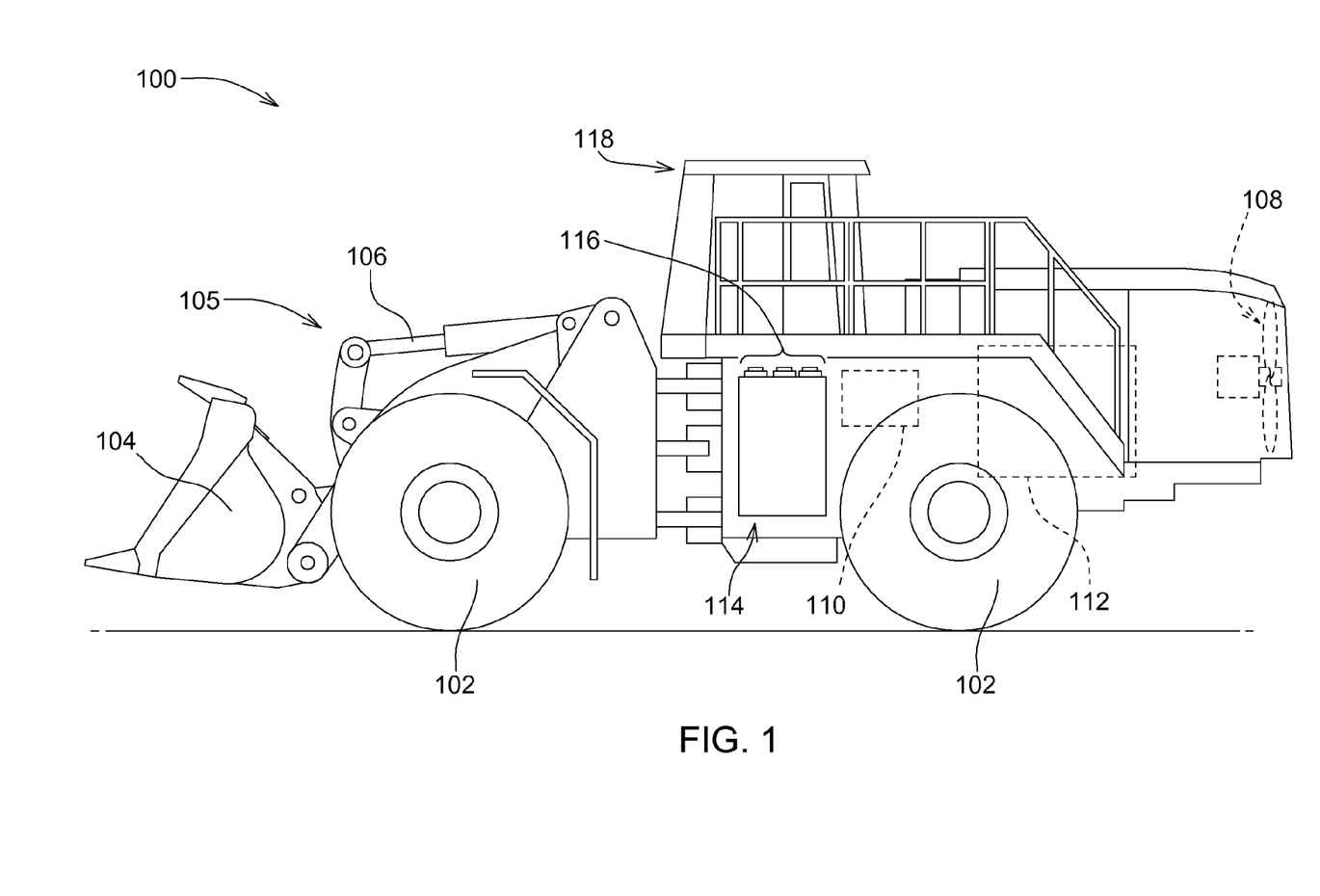
FIG. 1 is a left side elevation view of a vehicle with a hydraulic reservoir.

FIG. 1 illustrates vehicle 100, comprising wheels 102, tool 104, tool linkage 105, tool cylinder 106, hydraulic fan assembly 108, hydraulic pump 110, engine 112, hydraulic reservoir 114, hydraulic filters 116, and operator station 118.

Vehicle 100 is a wheel loader, but the vehicle may also be any other vehicle with a fluid reservoir, for example, a backhoe loader, crawler, excavator, feller buncher, forwarder, harvester, knuckleboom loader, motor grader, scraper, skidder, skid steer loader, track loader, or truck. The powertrain of vehicle 100 engages the ground through wheels 102, of which there are four, which roll on the ground and provide support and traction for vehicle 100.

Tool 104 is positioned at the front end of vehicle 100 and is connected to vehicle 100 by tool linkage 105. Tool 104 is a hydraulically actuated bucket which may be loaded with material, such as dirt, gravel, or rock. Tool 104 has two pivotal connections to tool linkage 105, enabling tool linkage 105 to control both the height and rotation of tool 104. Tool linkage 105 consists of multiple rigid members, many of which are pivotally connected to each other, that transfer forces between tool 104 and the remainder of vehicle 100. An example of a tool linkage for a wheel loader is disclosed in U.S. Pat. No. 8,386,133, issued Feb. 26, 2013, which is incorporated herein by reference. Tool cylinder 106 is pivotally connected to tool linkage 105, through which it actuates and controls one aspect of tool linkage 105, the aspect which controls the rotation of tool 104. This aspect may be referred to as bucket curl and bucket dump. Additional hydraulic cylinders (not shown) may actuate and control another aspect of tool linkage 105, the aspect which controls the height of tool 104. This aspect may be referred to as boom raise and boom lower. Tool cylinder 106 is a hydraulic double-acting cylinder with a pivotal connection at each of its ends. Tool cylinder 106 may thereby be used to actuate tool 104. Tool cylinder 106 is referred to as "double-acting" because it may, depending on how it is being hydraulically controlled, generate force tending to extend tool cylinder 106 or force tending to retract tool cylinder 106. When tool cylinder 106 extends, tool 104 curls, or rotates clockwise when viewed from the left such that the front of tool 104 moves upwards and material is trapped by gravity within tool 104. When tool cylinder 106 retracts, tool 104 dumps, or rotates counterclockwise when viewed from the left such that the front end of tool 104 moves downwards and material is ejected from tool 104 by gravity. Vehicle 100 includes other hydraulic cylinders, including those controlling the height of tool 104 and the steering of vehicle 100.

Hydraulic fan assembly 108 is positioned near the rear end of vehicle 100. Hydraulic fan assembly 108 may generate airflow across and through cooling components such as heat-exchangers for hydraulic fluid (e.g., hydraulic oil), air conditioning refrigerant, engine coolant, engine oil, axle oil, and intake air, to name but a few possible fluids that may be cooled by hydraulic fan assembly 108. Hydraulic fan assembly 108 includes a hydraulic motor which rotates the fan blades and is supplied with hydraulic flow by a control valve which in turn is supplied with hydraulic flow by hydraulic pump 110. The rotation of the fan blades draws air from an interior area of the chassis of vehicle 100 and expels it out the rear of vehicle 100.

Hydraulic pump 110 is located in an internal area of the chassis of vehicle 100, below cab 120 and forward of engine 112. Hydraulic pump 110 is a variable displacement pressure-compensated load-sensing axial-piston hydraulic pump that is mechanically driven by engine 112. Alternative embodiments may utilize one or more of a number of alternative hydraulic pump types, including vane, centrifugal, gear, or radial piston, to name but a few types, and may be of a fixed displacement or variable displacement type. Hydraulic pump 110 is rotationally coupled to engine 112 via a spline of hydraulic pump 110 meshing with gearing which ultimately meshes with the crankshaft of engine 112.

Engine 112 is positioned rearward of hydraulic pump 110 in an internal area of the chassis of vehicle 100. Engine 112 is a diesel engine which provides mechanical power that hydraulic pump 110 converts into hydraulic power that is distributed to various components of vehicle 100, including tool cylinder 106 and hydraulic fan assembly 108. Hydraulic pump 110 is fluidly connected to hydraulic reservoir 114 such that it draws hydraulic fluid from hydraulic reservoir 114 and outputs such hydraulic fluid at pressure to hydraulic circuits of vehicle 100 (see FIG. 2).

Hydraulic reservoir 114 serves multiple purposes on vehicle 100, including the collection, storage, cooling, and deaeration of hydraulic fluid. Hydraulic reservoir 114 comprises mounts for hydraulic filters 116. Hydraulic filters 116 filter hydraulic fluid as it returns to hydraulic reservoir 114 from certain hydraulic circuits on vehicle 100, including those circuits comprising tool cylinder 106 and hydraulic fan assembly 108.

Figure 2:
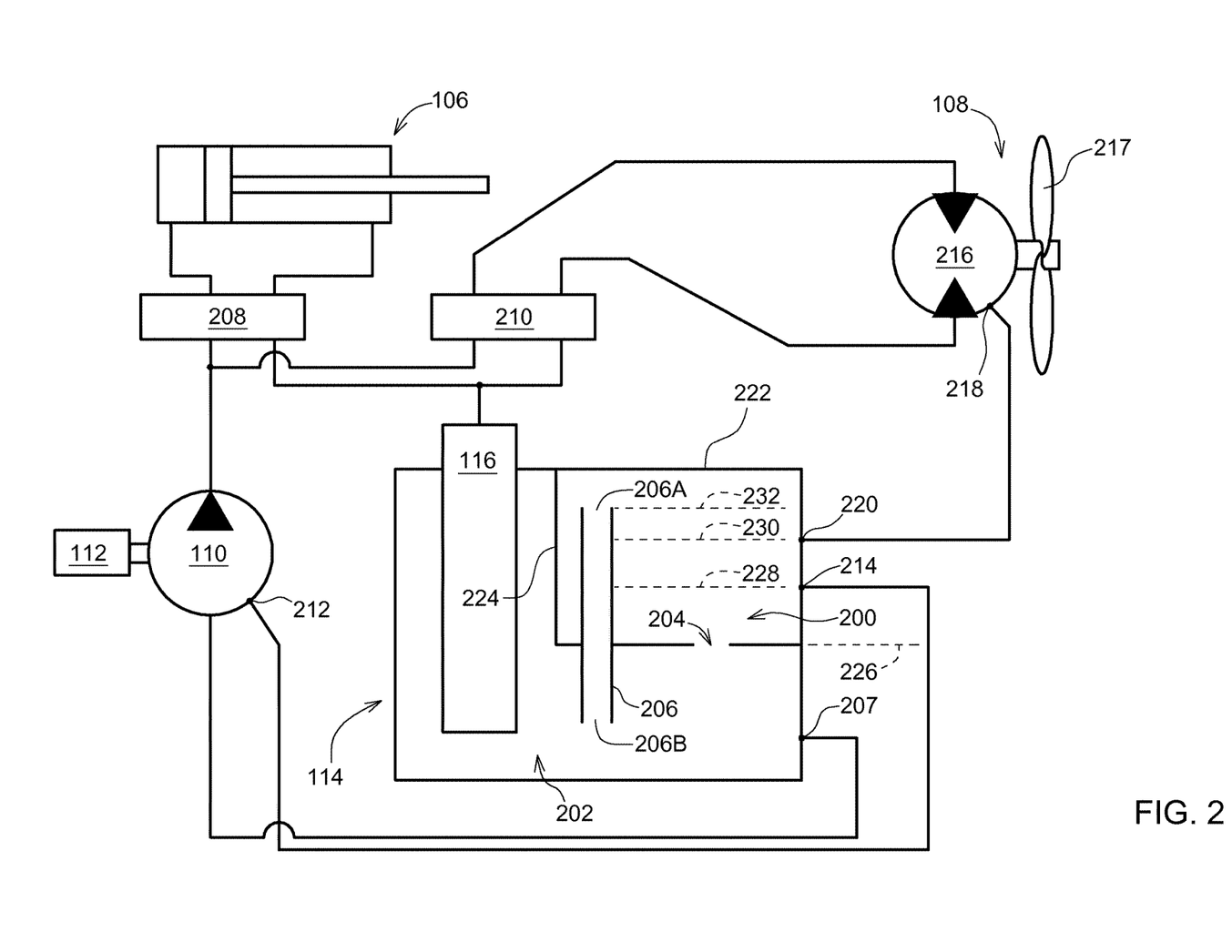
FIG. 2 is a schematic of portions of the hydraulic system of the vehicle.

FIG. 2 is a schematic depicting portions of the hydraulic system of vehicle 100. Reservoir 114 comprises mounts for hydraulic filters 116, of which there are three in this embodiment (see FIG. 3), first compartment 200, second compartment 202, drain 204, and tube 206.

Hydraulic pump 110, mechanically driven by engine 112, draws hydraulic fluid from second compartment 202 through a hydraulic line connected to supply port 207 of hydraulic reservoir 114. Hydraulic pump 110 is thereby fluidly connected to second compartment 202 of hydraulic reservoir 104. The hydraulic line comprises a hydraulic hose with a hydraulic connector on each end of the hose, with one of the connectors mating to an input port on hydraulic pump 110 and the connector at the other end of the hydraulic line mating to supply port 207. Hydraulic pump 110 takes hydraulic fluid from its input port and outputs it from one or more of its output ports to tool control valve 208 and fan control valve 210 at a pressure determined in part by the pressure of the work ports of tool control valve 208 and fan control valve 210 (i.e., the ports connected to tool cylinder 106 and hydraulic fan assembly 108, respectively). The pressure of the work ports of tool control valve 208 and fan control valve 210 is communicated to hydraulic pump 110 by one or more load-sense hydraulic lines, which fluidly connect these two valves to hydraulic pump 110. To simplify the schematic, these load-sense lines are not depicted in FIG. 2.

Hydraulic pump 110 includes case drain supply port 212. Case drain supply port 212 is fluidly connected to an area inside the case of hydraulic pump 110 which collects leakage, cooling, and other miscellaneous flow from hydraulic pump 110 (i.e., case drain flow). Case drain supply port 212 is fluidly connected to case drain return port 214, such that case drain flow from hydraulic pump 110 drains into first compartment 200 of hydraulic reservoir 114. The case drain flow from hydraulic pump 110 may drain directly to hydraulic reservoir 114 rather than drain through hydraulic filters 116 to reduce the pressure within the case of hydraulic pump 110. This case drain flow may contain contaminants, but it does not pass through hydraulic filters 116 as it returns to the hydraulic reservoir 114. If there is substantial contamination, which may occur if hydraulic pump 110 were to have a failure for example, the contamination may cause damage to other hydraulic components if it is allowed to recirculate through the hydraulic system of vehicle 100. To mitigate this risk, a screen may be placed over case drain return port 214 to capture debris as it enters first compartment 200 (see FIG. 5). The screen may be a mesh which captures the debris but allows hydraulic fluid to continue flowing into first compartment 200.

Hydraulic pump 110 supplies hydraulic fluid at pressure to tool control valve 208. Tool control valve 208 controls hydraulic flow to and from tool cylinder 106, for example through a series of spool valves, and thereby controls the position of tool cylinder 106 which in turn controls the actuation of tool 104. In this embodiment, tool control valve 208 and tool cylinder 106 control the rotational position of tool 104, which may be referred to as bucket curl and bucket dump. Hydraulic pump 110 also supplies hydraulic fluid at pressure to fan control valve 210. Fan control valve 210 controls hydraulic flow to and from hydraulic fan assembly 108, for example through one or more spool or poppet valves. Hydraulic fan assembly 108 includes hydraulic motor 216, which receives the hydraulic fluid from fan control valve 210. Hydraulic motor 216, which may be a fixed displacement axial piston hydraulic motor, is driven in a direction and at a speed dictated by the hydraulic flow it receives from fan control valve 210. Hydraulic motor 216 is mechanically coupled to fan 217, which includes a series of blades designed to move air when rotated. Fan control valve 210 thereby controls the direction and speed of rotation of fan 217. Hydraulic motor 216 includes case drain supply port 218, which is used to drain the hydraulic fluid in the case of hydraulic motor 216 into hydraulic reservoir 114. Case drain supply port 218 is fluidly connected to case drain return port 220, such that hydraulic fluid from hydraulic motor 216 drains into first compartment 200 of hydraulic reservoir 114. Case drain return port 220 includes a screen to capture debris from the case drain of hydraulic motor 216 (see FIG. 5).

Tool control valve 208 and fan control valve 210 each have a return port fluidly connected to hydraulic filters 116. Hydraulic fluid returning from tool cylinder 106 and returning from hydraulic fan assembly 108 travels through tool control valve 208 and fan control valve 210, respectively, then drains into second compartment 202 of hydraulic reservoir 114 through hydraulic filters 116. Hydraulic filters 116 filter this returning hydraulic fluid, for example by forcing it through filtering media, which removes contaminants and debris. Hydraulic filters 116 may include a relief valve or bypass which permits hydraulic fluid to bypass the filtering media when the pressure differential across hydraulic filters 116 is above a threshold, which may occur if the filtering media is clogged, the hydraulic fluid is cold, or the flow rate of the hydraulic fluid is high. In this embodiment, the flow rate of hydraulic fluid into hydraulic reservoir 114 through hydraulic filters 116 may be multiple times the flow rate of hydraulic fluid into hydraulic reservoir 114 through case drain return port 214 and case drain return port 220 when vehicle 100 is being operated. As but one example, the combined hydraulic flow from tool control valve 208 and fan control valve 210 into hydraulic reservoir 114 through hydraulic filters 116 may average approximately 100 L/min (ranging from 0-500 L/min) during operation of vehicle 100, while the combined hydraulic flow from the case drain supply port 218 of hydraulic pump 110 and case drain supply port 218 of hydraulic motor 216 into hydraulic reservoir 114 may average approximately 25 L/min (ranging from 0-50 L/min) for the same cycle.

A portion of the hydraulic system for vehicle 100 is depicted in FIG. 2. For simplicity, additional portions of the hydraulic system, including control valves for boom raise and boom lower, brakes, and other functions, coolers, accumulators, and additional hydraulic pumps, have not been shown.

Hydraulic reservoir 114 comprises external wall 222, which defines the boundary between the interior and exterior of hydraulic reservoir 114, and internal wall 224, which defines the boundary between first compartment 200 and second compartment 202. External wall 222 forms a barrier which generally prevents hydraulic fluid from leaking out of hydraulic reservoir 114 in normal operation. Hydraulic reservoir may therefore be said to retain hydraulic fluid. Hydraulic reservoir 114 may have a breather, which permits air exchange between its interior and exterior, which may permit air or hydraulic fluid to leave hydraulic reservoir 114 when it is over pressure or overfilled. Even though hydraulic reservoir 114 may permit hydraulic fluid to leak out in certain circumstances, it may still be referred to as retaining hydraulic fluid. External wall 222 comprises mounts for hydraulic filters 116 and multiple ports that allow hydraulic lines to be connected to hydraulic reservoir 114 (see FIG. 3), including supply port 207, case drain return port 214, and case drain return port 220. These ports may comprise a through-hole in external wall 222 with a fitting secured in or around the through-hole. This fitting mates with a hydraulic line, for example through mating threads on the fitting and a connector secured to the end of the hydraulic line with a seal compressed between the faces of the fitting and the connector. When mated, the port and the hydraulic line form a fluid tight connection which allows hydraulic flow between the interior of hydraulic reservoir 114 and the interior of the hydraulic line.

Internal wall 224 is located within hydraulic reservoir 114 and within external wall 222. Internal wall 224 is affixed to the inside of external wall 222 (i.e., the side of external wall 222 facing first compartment 200 and second compartment 202), for example via welds along the area where internal wall 224 meets external wall 222. Internal wall 224 forms a barrier which generally prevents hydraulic fluid from leaking from first compartment 200 to second compartment 202, and therefore first compartment 200 may retain hydraulic fluid. Internal wall 224 comprises certain openings which permit hydraulic fluid to flow from first compartment 200 to second compartment 202, such as drain 204 and tube 206. Internal wall 224 may also comprise additional openings, such as an opening positioned above the normal fluid levels in first compartment 200 and second compartment 202 that allows air to flow between the two compartments, or an opening positioned above those normal fluid levels that allows hydraulic fluid to flow between first compartment 200 and second compartment 202 when one of the compartments is overfilled.

First compartment 200 of hydraulic reservoir 114 collects hydraulic fluid from the case drains of hydraulic pump 110 and hydraulic motor 216, and this collected hydraulic fluid may drain to second compartment 202 over time through drain 204 and tube 206. In this embodiment, drain 204 is a through-hole in internal wall 222 and tube 206 is a pipe which interconnects first compartment 200 and second compartment 202. In alternative embodiments, drain 204 may be replaced by a tube fluidly connecting first compartment 200 to second compartment 202 (e.g., tube 205 in FIG. 4b) and tube 206 may be replaced by a through-hole fluidly connecting first compartment 200 to second compartment 202.

Drain 204 is a through-hole positioned on the lowest portion of internal wall 222. Drain 204 is therefore fluidly connected to both first compartment 200 and second compartment 202, as fluid may flow through drain 204 between the compartments. Drain 204 allows hydraulic fluid to flow from first compartment 200 to second compartment 202 when there is a sufficient volume of hydraulic fluid in first compartment 200. The lowest portion of internal wall 222 is a flat surface so, depending on the viscosity of the hydraulic fluid, only a small volume of hydraulic fluid in first compartment 200 may be necessary to allow hydraulic fluid to flow through drain 204 to second compartment 202. In alternative embodiments, internal wall 222 may be formed with a rounded or sloped surface at the bottom rather than the flat surface in the embodiment depicted in FIG. 3, with drain 204 located at the lowest point thereon to reduce the amount of hydraulic fluid which may be trapped in first compartment 200.

Tube 206 is a pipe which is affixed to internal wall 222, for example via welds along the perimeter of tube 206 where it meets with internal wall 222, with first end 206a located within first compartment 200 and the opposite end, second end 206b, located within second compartment 202. Tube 206 is a hollow right cylinder wherein first end 206a and second end 206b are both open ends that may act as entrances so that fluid may flow through the pipe from either end (see FIG. 3). In alternative embodiments, tube 206 may be any number of tube designs, including a hose or other flexible tube, or a tube with a non-circular cross-sectional shape, or it may instead be a through-hole, to name but a few alternative designs.

The entrance to drain 204 is located at the top end of drain 204, at drain entrance height 226. When the level of the hydraulic fluid in first compartment 200 is higher than (i.e., with respect to the direction of gravity) drain entrance height 226, hydraulic fluid will flow from first compartment 200 to second compartment 202 through drain 204. Case drain return port 214 and case drain return port 220 are located on external wall 222 at port height 228 and port height 230, respectively. Port height 228 and port height 230 are each higher than drain entrance height 226. First end 206a of tube 206 is located inside first compartment 200 at tube entrance height 232, which is higher than drain entrance height 226. When the level of hydraulic fluid in first compartment 200 is higher than tube entrance height 232, hydraulic fluid will flow from first compartment 200 to second compartment 202 through tube 206.

When vehicle 100 begins operating, the combined hydraulic fluid flow rate of case drain return port 214 and case drain return port 220 is often greater than the flow rate of hydraulic fluid through drain 204 due to the limited cross-sectional flow area of drain 204. For example, drain 204 may be a through-hole of a small diameter, such as 5 millimeters, and thus the minimum cross-sectional flow area is correspondingly small, such as approximately 19.6 square millimeters. This causes the hydraulic fluid level in first compartment 200 to rise as hydraulic fluid is being added to first compartment 200 through case drain return port 214 and case drain return port 220 faster than it is being drained from first compartment 200 through drain 204. This configuration may allow time for hydraulic fluid in first compartment 200 to deaerate (i.e., remove air entrained in the hydraulic fluid) before it flows to second compartment 202. Hydraulic fluid flowing into first compartment 200 may already be aerated (i.e., have air entrained in the hydraulic fluid), or may become aerated if it flows into first compartment 200 when the fluid level in first compartment 200 is lower than port height 228 and port height 230, causing it to freefall for a distance before hitting the top of the fluid in first compartment 200. First compartment 200 may provide a deaeration area for hydraulic fluid to help manage and reduce the aeration level of hydraulic fluid in second compartment 202. This may help in providing hydraulic pump 110 with deaerated hydraulic fluid as it draws hydraulic fluid from second compartment 202 through supply port 207.

As vehicle 100 continues operating, the hydraulic fluid may eventually rise past port height 228 and port height 230. Once this occurs, hydraulic fluid flowing into first compartment 200 through case drain return port 214 and case drain return port 220 will no longer fall until it reaches the fluid level of first compartment 200. Instead, such hydraulic fluid will emerge from case drain return port 214 and case drain return port 220 at or below the fluid level of first compartment 200, which may reduce aeration of the fluid.

Continued operation of vehicle 100 may cause further increases in the fluid level in first compartment 200 until it rises to tube entrance height 232. After the fluid level is higher than tube entrance height 232, hydraulic fluid may begin flowing through tube 206 from first compartment 200 to second compartment 202. Tube 206 may be sized with a suitable minimum cross-sectional flow area such that it is capable of draining hydraulic fluid from first compartment 200 to second compartment 202 at a flow rate greater than the total flow rate into first compartment 200 from case drain return port 214, case drain return port 220, and any other ports fluidly connected to first compartment 200. This minimum cross-sectional flow area of tube 206 may be multiple times the minimum cross-sectional flow area of drain 204. Additional passages between first compartment 200 and second compartment 202 may be provided to allow air to flow from second compartment 202 to first compartment 200 to replace the volume of hydraulic fluid flowing from first compartment 200 to second compartment 202, such as a through-hole in internal wall 224 at a height greater than the tube entrance height 232. Such air holes may permit hydraulic fluid to flow from first compartment 200 to second compartment 202 through drain 204 or tube 206 more quickly, smoothly, and with less aeration.

Positioning tube entrance height 232 higher than either port height 228 or port height 230 allows first compartment 200 to fill with hydraulic fluid above port height 228 or port height 230. This may reduce the aeration as hydraulic fluid enters first compartment 200 submerged rather than falling to the fluid level of first compartment 200. Further, this may allow hydraulic fluid entering first compartment 200 to circulate and deaerate within first compartment 200 for a period of time before draining through drain 204 or tube 206 into second compartment 202. This may allow hydraulic fluid within second compartment 202, which is the fluid drawn by supply port 207, to be less aerated, which may be desirable for the operation of hydraulic components such as hydraulic pump 110, tool control valve 208, and fan control valve 110. Although tube entrance height 232 is higher than either port height 228 or port height 230 in this embodiment, in alternative embodiments it may be lower but the reservoir may be designed to still achieve many of the same advantages. For example, an alternative embodiment may have port height 230 higher than tube entrance height 232, but case drain return port 220 may be configured to drain hydraulic fluid into first compartment 200 away from first end 206a. This may allow the fluid to circulate and deaerate within first compartment 200 for a period of time before it flows into tube 206.

The lower end of tube 206, second end 206b, may, but need not, be positioned within second compartment 202 at a height below the normal operating fluid level of second compartment 202. Positioning second end 206b below the normal operating fluid level of second compartment 202 allows hydraulic fluid flowing from first compartment 200 to second compartment 202 to exit tube 206 submerged in hydraulic fluid, which may reduce aeration. The position of second end 206b may also be adjusted to improve how hydraulic fluid circulates within second compartment 202, to prevent fluid from continually flowing straight from tube 206 into supply port 207 and instead allow hydraulic fluid to circulate throughout second compartment 202.

Figure 3:
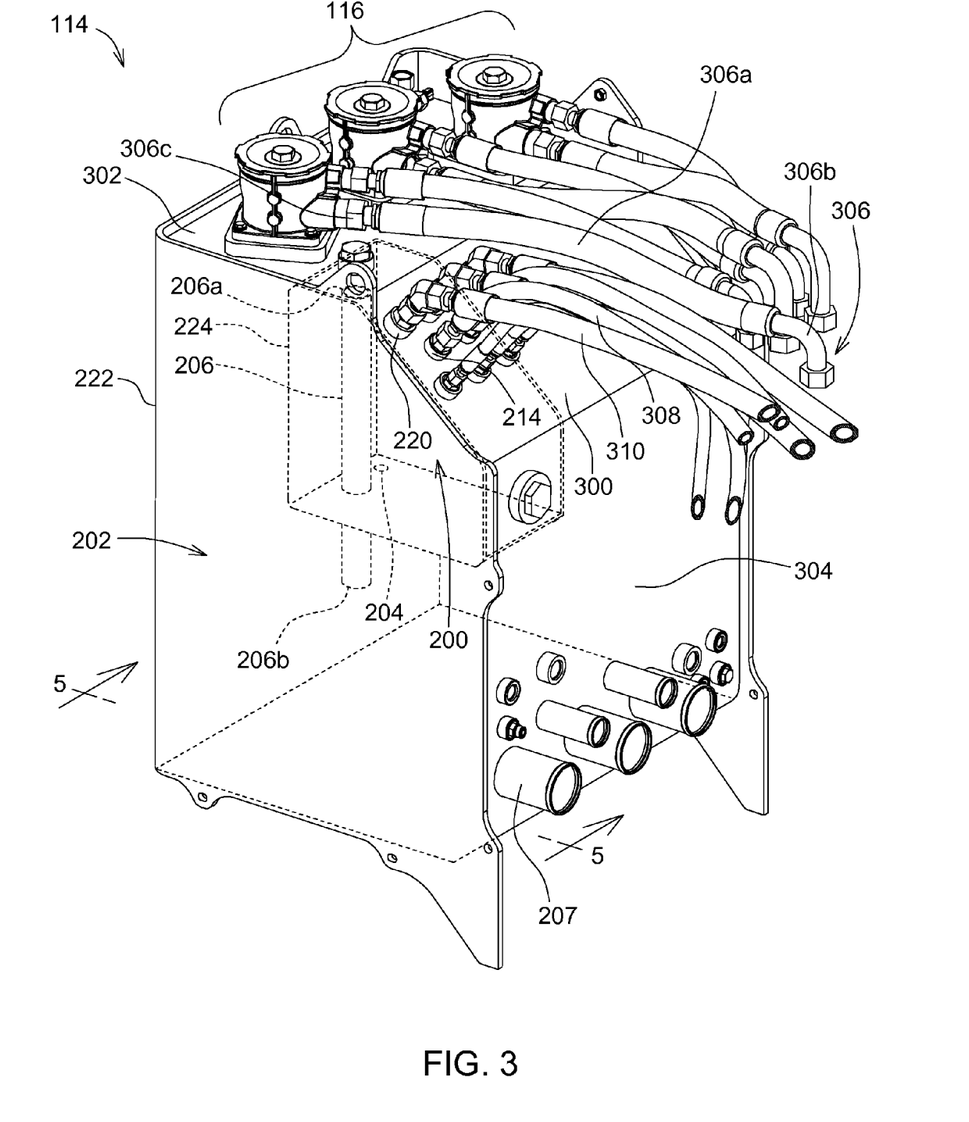
FIG. 3 is a perspective view of the hydraulic reservoir.

FIG. 3 is a perspective view of hydraulic reservoir 114 which includes portions of certain hydraulic lines connected to it. Hydraulic reservoir 114 includes a weldment comprising several metal sheets, some of which are bent, welded together, with filter mounts and multiple ports attached (e.g., supply port 207, case drain return port 214, case drain return port 220). In alternative embodiments, hydraulic reservoir 114 may be formed by other manufacturing techniques, such as machining, stamping, or forging, or may be composed of other materials, such as plastic. External wall 222 defines a boundary between the interior and the exterior of hydraulic reservoir 114 and provides a barrier that permits hydraulic reservoir 114 to retain hydraulic fluid. In this embodiment, external wall 222 is comprised of multiple metal sheets joined together by welds, and forms a box-like shape with seven sides instead of six, the seventh side comprising slanted surface 300 which extends from top surface 302 to side surface 304, one of four sides of the box-like shape, and thereby cuts off an edge of the box-like shape. Hydraulic filters 116 are mounted on top surface 302 of external wall 222, multiple ports (including case drain return port 214 and case drain return port 220) are positioned on slanted surface 300, and multiple ports (including supply port 207) are positioned on side surface 304 below slanted surface 300.

Internal wall 224 defines a boundary between first compartment 200 and second compartment 202 and provides a barrier that permits first compartment 200 to retain hydraulic fluid. Internal wall 224 includes multiple metal sheets bent and welded together, then affixed to external wall 222 by welds where internal wall 224 comes into contact with external wall 222. When affixed to external wall 222, internal wall 224 forms a box-like interior structure which forms first compartment 200. Internal wall 224 is affixed to top surface 302, slanted surface 300, and side surface 304 of external wall 222, which positions first compartment 200 toward the top of fluid reservoir 114.

Drain 204 and tube 206 are both positioned on internal wall 224 and permit hydraulic fluid to flow from first compartment 200 to second compartment 202. Drain 204 is located on the bottom surface of internal wall 224 and is a through hole which interconnects first compartment 200 with second compartment 202. In alternative embodiments, drain 204 may be a pipe, tube, hose, or other component which may fluidly connect first compartment 200 with second compartment 202. Tube 206 also interconnects first compartment 200 and second compartment 202, and may take hydraulic fluid in at first end 206a positioned within and near the top of first compartment 200 and may expel hydraulic fluid at second end 206b positioned within second compartment 202. Tube 206 traverses internal wall 224 and is affixed to internal wall 224 via welds along the external circumference of tube 206 where it meets internal wall 224. In alternative embodiments, tube 206 may be shaped differently (e.g., a square or rectangular hollow tube) or comprised of a different material (e.g., a flexible hose). Further, tube 206 need not be positioned within first compartment 200, but instead may be positioned within second compartment 202 and fluidly connected to first compartment 200, for example with a through-hole in internal wall 224 allowing first end 206a to fluidly connect with first compartment 200.

Return line 306 is a hydraulic line, including return line hose 306a, return line first connector 306b, and return line second connector 306c. Return line 306 is fluidly connected at one end by return line first connector 306b threading on to a return port of a control valve, such as tool control valve 208 or fan control valve 210, and is fluidly connected at the opposite end by return line second connector 306c threading on to a port of one of hydraulic filters 116. Return line 306 permits hydraulic fluid to flow from the control valve to second compartment 202 of hydraulic reservoir 114 through one of hydraulic filters 116, and thereby provides a flow path for hydraulic fluid to return to hydraulic reservoir 114 from tool cylinder 106 or hydraulic motor 216. The embodiment illustrated in FIG. 3 comprises multiple such return lines, each connected to one of hydraulic filters 116, of which only return line 306 has been labeled for simplicity.

Supply port 207 is located near the bottom of hydraulic reservoir 114. Supply port 207 includes a tube which traverses external wall 222 of hydraulic reservoir 114 and is affixed to external wall 222 by welds along its circumference. Supply port 207 thereby is fluidly connected with second compartment 202 and forms a passage between second compartment 202 and the exterior of hydraulic reservoir 114. A hydraulic line, which may be referred to as a supply line, may be fluidly connected to supply port 207 and fluidly connected to hydraulic pump 110 so as to allow hydraulic pump 110 to draw fluid from second compartment 202 of hydraulic reservoir 114. Such a supply line may be fluidly connected to supply port 207 by sliding a flexible hydraulic hose over the end of supply port 207 and then tightening a circular clamp over the area where the hydraulic hose overlaps supply port 207 and compressing this clamp to create a fluid tight seal between the supply line and supply port 207. Supply port 207 may have a bead or raised surface around its circumference near its end to assist in creating a fluid tight seal and preventing the flexible hydraulic hose from slipping off. The supply line may be fluidly connected to hydraulic pump 110 by mating hydraulic connectors, such as threaded connectors which compress a face seal, or by alternative connection methods, such as the clamped flexible hydraulic hose which may be used to connect to supply port 207.

Case drain line 308 permits hydraulic fluid to flow from the case drain of hydraulic pump 110 into first compartment 200 of hydraulic reservoir 114. Case drain line 308 is fluidly connected at one end to case drain supply port 212 (not shown) and is fluidly connected at the opposite end to case drain return port 214. Case drain line 310 permits hydraulic fluid to flow from the case drain of hydraulic motor 216 into first compartment 200 of hydraulic reservoir 114. Case drain line 310 is fluidly connected at one end to case drain supply port 218 (not shown) and is fluidly connected at the opposite end to case drain return port 220.

Figure 4A:
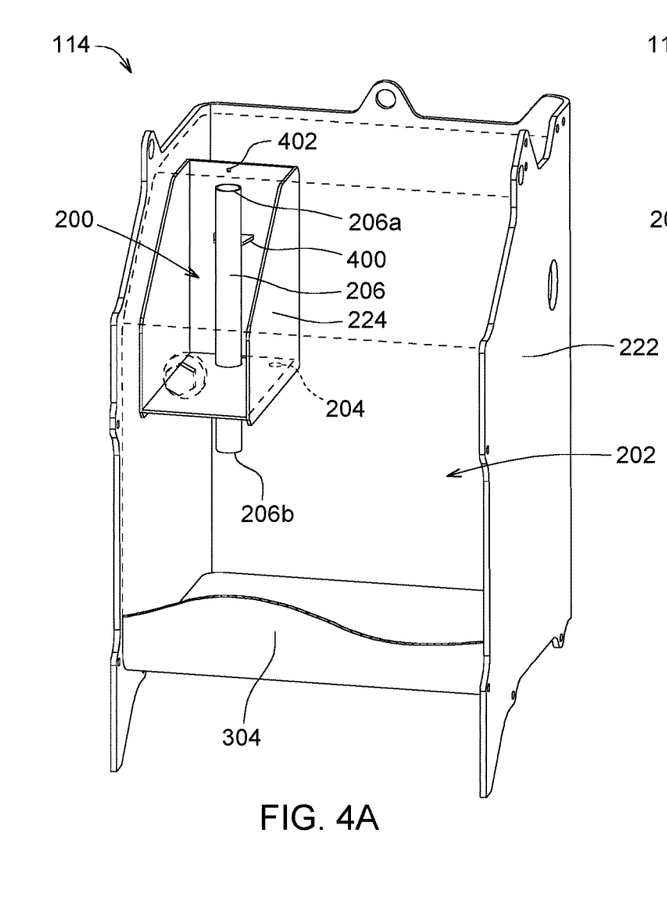
FIG. 4a is a perspective view of the hydraulic reservoir with portions removed.
Figure 4B:
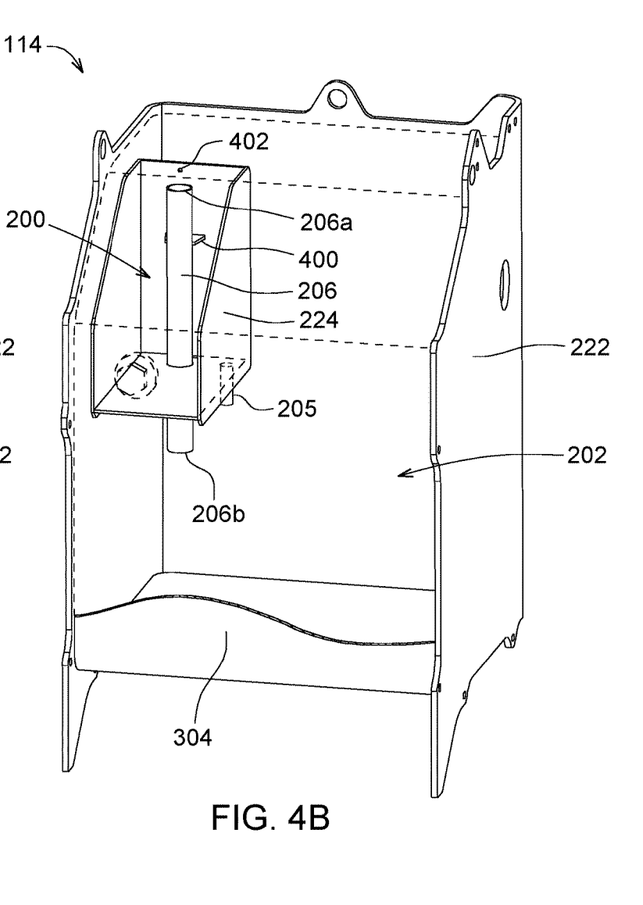

FIG. 4a depicts hydraulic reservoir 114 with portions removed to better depict its interior. Top surface 302, slanted surface 300, and most of side surface 304 of external wall 222 have been removed, and thus the edge of internal wall 224 which is normally affixed to external wall 222 by welds is visible. Internal wall 224 is positioned against top surface 302, slanted surface 300, and side surface 304 of external wall 222, and is located close to, but not contacting, another side surface of external wall 222. In alternative embodiments, internal wall 224 may be positioned against another side surface of external wall 222, eliminating the need for one surface of internal wall 224 as it may share a surface with external wall 222.

In addition to being affixed to internal wall 224 along its external circumference, tube 206 may also be affixed to internal wall 224 by gusset 400 located toward first end 206a of tube 206. Gusset 400 is a metal piece with a profile that is flat along one side, which is welded to internal wall 224, and has an arc along the opposite side which allows it to form a line of contact with tube 206 for welding. Gusset 400 may provide additional support to tube 206, increasing its rigidity and strength.

Through-hole 402 is positioned on internal wall 224 above gusset 400 and higher than first end 206a of tube 206. Through-hole 402 is a hole through internal wall 224 which is fluidly connected to both first compartment 200 and second compartment 202. Through-hole 402 may be used to allow air to flow from second compartment 202 to first compartment 200. This air flow may aid in allowing hydraulic fluid to drain from first compartment 200 to second compartment 202 through drain 204 or tube 206, as it may provide air to replace the volume of hydraulic fluid lost from first compartment 200 and avoid vacuum pressure forming within first compartment 200.

As can be seen from FIG. 4a, second compartment 202 may have a substantially larger volume than first compartment 200. In this embodiment, the total volume of second compartment 202 is more than ten times greater than first compartment 200. This allows second compartment 202 to hold the majority of the hydraulic fluid in hydraulic reservoir 114, while first compartment 200 can be used to deaerate a smaller volume of hydraulic fluid before draining it to second compartment 202.

Figure 5:
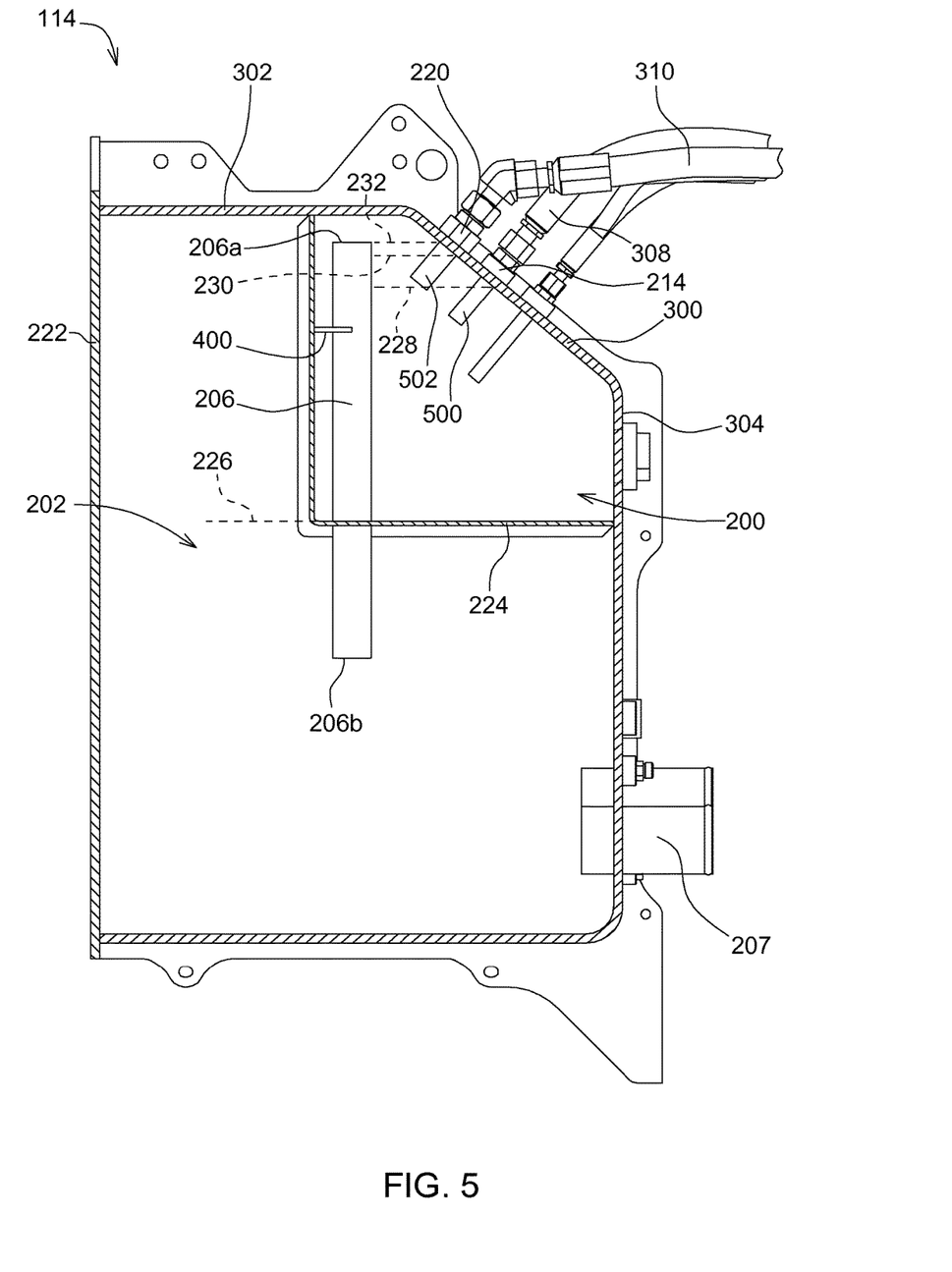
FIG. 5 is a sectional view of the hydraulic reservoir along the plane 5-5 shown in FIG. 3.

FIG. 5 depicts a sectional view of hydraulic reservoir 114, along the section plane 5-5 identified in FIG. 3. Hydraulic fluid may enter hydraulic reservoir 114 through hydraulic filters 116 (not shown) or through the return ports positioned on sloped surface 300. Case drain return port 214 fluidly connects the case drain of hydraulic pump 110 to first compartment 200 at port height 228. Case drain return port 220 fluidly connects the case drain of hydraulic motor 216 to first compartment 200 at port height 230. Case drain return port 214 and case drain return port 220 each have a screen, screen 500 and screen 502 respectively, through which the returning hydraulic fluid flows. Screen 500 and screen 502 are formed of a fine steel mesh that may capture debris so that it does not enter first compartment 200. Alternatively, these screens may be constructed of different materials, such as other metals or plastics, or may comprise filtering media or traps which collect debris.

When vehicle 100 is in operation, the hydraulic fluid level in first compartment 200 rises as hydraulic fluid flows through case drain return port 214, case drain return port 220, and other ports. Hydraulic fluid begins draining out of first compartment 200 into second compartment 202 through drain 204 (see FIG. 4a), the entrance to which is at drain height 226. In this embodiment, the cross-sectional flow area of drain 204 is sized such that its drainage flow rate is less than the combined flow rate of the return ports draining into first compartment 200, so the fluid level in first compartment 200 rises as vehicle 100 operates. Eventually, the fluid level rises above port height 228 and port height 230, so these ports are submerged. This submersion may help reduce the aeration of hydraulic fluid returning to hydraulic reservoir 114, as the hydraulic fluid will not have to fall a distance before contacting the hydraulic fluid level of first compartment 200.

As vehicle 100 continues to operate, the hydraulic fluid level in the first compartment may rise above tube entrance height 232. When this occurs, hydraulic fluid will begin draining from first compartment 200 through tube 206 to second compartment 202. Tube 206 is sized with a suitable cross-sectional flow area such that the combined drainage flow rate of drain 204 and tube 206 is greater than the combined flow rate of the ports draining into first compartment 200. In this embodiment, the cross-sectional flow area of tube 206 is more than ten times greater than that of drain 204. With this combined drainage flow rate, the hydraulic fluid level in first compartment 200 will not rise much beyond tube entrance height 232. Hydraulic fluid from first compartment 200 collects in second compartment 202 where it may circulate, deaerate, and eventually be drawn back in to the hydraulic system of vehicle 100 through supply port 207.

When hydraulic flow into first compartment 200 ceases, such as after vehicle 100 is turned off, the hydraulic fluid level in first compartment 200 will begin to drop as drain 204 and tube 206 continue to provide drainage flow. After a sufficient period of time has passed, drain 204 will have drained enough hydraulic fluid so that the hydraulic fluid level in first compartment 200 is lower than port height 228. Once this occurs, case drain line 308 or case drain line 310 may be disconnected from case drain return port 214 or case drain return port 220 without hydraulic fluid flowing from first compartment 200 out of hydraulic reservoir 114. This may allow screen 500 and screen 502 to be checked for trapped debris without emptying hydraulic reservoir 114 of hydraulic fluid. Such a feature may make it easier and less costly to investigate whether debris is present and if a failure has occurred in the hydraulic system of vehicle 100. For example, if hydraulic pump 110 is believed to have experienced a failure, vehicle 100 may be shut off, case drain line 308 may be disconnected from case drain return port 214 after the hydraulic fluid level in first compartment 200 falls below port height 228, screen 500 may be checked for debris, hydraulic pump 110 may be replaced if debris indicative of a pump failure is found, and case drain line 308 may be reconnected to case drain return port 214. If debris is found, hydraulic reservoir 114 may still need to be emptied and refilled if there a risk of contaminants in the hydraulic system of vehicle 100. If debris is not found, hydraulic reservoir 114 may not need to be emptied.

While the embodiments described herein relate to hydraulic reservoirs, the present disclosure may be applied to other fluid reservoirs such as those for engine oil, axle oil, coolant, refrigerants, and water.

While the disclosure has been illustrated and described in detail in the drawings and foregoing description, such illustration and description is not restrictive in character, it being understood that illustrative embodiment(s) have been shown and described and that all changes and modifications that come within the spirit of the disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A fluid reservoir, comprising:
   a first compartment;
   a second compartment;
   a port fluidly connected to the first compartment, the port positioned at a port height;
   a drain fluidly connected to the first compartment and the second compartment, an entrance to the drain positioned in the first compartment at a drain entrance height, the drain entrance height lower than the port height; and
   a tube fluidly connected to the first compartment and the second compartment, an entrance to the tube positioned in the first compartment at a tube entrance height, the tube entrance height higher than the drain height.

2. The fluid reservoir of claim 1, wherein the tube entrance height is higher than the port height.

3. The fluid reservoir of claim 2, further comprising:
   a return line fluidly connected to the first compartment through the port; and
   a supply line fluidly connected to the second compartment at a supply line height, the supply line height lower than the port height.

4. The fluid reservoir of claim 3, wherein the port comprises a screen.

5. The fluid reservoir of claim 3, wherein the volume of the first compartment is less than half of the volume of the second compartment.

6. The fluid reservoir of claim 5, wherein the minimum cross-sectional flow area of the drain is less than a half of the minimum cross-sectional flow area of the tube.

7. The fluid reservoir of claim 6, wherein the drain comprises a through-hole in a wall of the first compartment.

8. The fluid reservoir of claim 6, wherein the drain comprises a second tube, the second tube is fluidly connected to the first compartment and the second compartment, and an entrance to the second tube is positioned in the first compartment at the drain entrance height.

9. The fluid reservoir of claim 5, wherein the minimum cross-sectional flow area of the drain is less than a tenth of the minimum cross-sectional flow area of the tube.

10. The fluid reservoir of claim 3, wherein the volume of the first compartment is less than a quarter of the volume of the second compartment.

11. The fluid reservoir of claim 3, wherein:
the fluid reservoir is a hydraulic reservoir;
the return line is fluidly connected to a case drain port of a hydraulic pump;
the supply line is fluidly connected to the input port of the hydraulic pump; and
the port comprises a screen.

12. The fluid reservoir of claim 11, wherein:
the first compartment is operable to retain hydraulic fluid;
the second compartment is operable to retain hydraulic fluid;
the port is operable to allow hydraulic fluid to flow from a case drain line to the first compartment;
the tube is operable to allow hydraulic fluid to flow from the first compartment to the second compartment when the first compartment is filled with hydraulic fluid above the tube entrance height; and
the drain is operable to allow hydraulic fluid to flow from the first compartment to the second compartment when the first compartment is filled with hydraulic fluid above the drain entrance height.

13. A fluid reservoir, comprising:
an external wall defining a boundary between the inside and outside of the fluid reservoir, the external wall comprising a case drain return port and a supply port;
an internal wall defining a boundary between a first compartment and a second compartment, the first compartment and the second compartment each located within the fluid reservoir, the internal wall affixed to the external wall, the internal wall comprising a first drain;
the case drain return port fluidly connected to the first compartment, the case drain return port positioned at a case drain return port height;
the supply port fluidly connected to the second compartment, the supply port positioned at a supply port height, the supply port height lower than the case drain return port height;
an entrance to the first drain positioned at a first drain entrance height, the first drain entrance height lower than the case drain return port height; and
a second drain included in the internal wall, the second drain fluidly connected to the first compartment and the second compartment, an entrance to the second drain positioned in the first compartment at a second drain entrance height, the second drain entrance height higher than the first drain entrance height.

14. The fluid reservoir of claim 13, wherein the second drain entrance height is higher than the case drain return port height.

15. The fluid reservoir of claim 14, further comprising:
a case drain line fluidly connected to the first compartment through the case drain return port; and
a supply line fluidly connected to the second compartment through the supply port.

16. The fluid reservoir of claim 15, wherein:
the case drain line is fluidly connected to a case drain port of a hydraulic pump; and
the supply line is fluidly connected to an input port of the hydraulic pump.

17. The fluid reservoir of claim 16, wherein the fluid reservoir is a hydraulic reservoir, the external wall further comprises a filter mount, and a hydraulic filter is installed on the filter mount.

18. The fluid reservoir of claim 17, wherein an output port of the hydraulic pump is fluidly connected to an input port of a control valve and an output port of the control valve is fluidly connected to the hydraulic filter.

19. A method of using a hydraulic reservoir, the method comprising:
connecting a case drain line from a case drain port of a hydraulic pump to a case drain return port of a first compartment of the hydraulic reservoir;
connecting a supply line from a second compartment of the hydraulic reservoir to an input port of the hydraulic pump;
operating the hydraulic pump until the level of hydraulic fluid in the first compartment rises above an entrance to a tube positioned in the first compartment and hydraulic fluid flows from the first compartment to the second compartment through the tube; and
ceasing the operation of the hydraulic pump until sufficient hydraulic fluid flows through a drain hole interconnecting the first compartment and the second compartment such that the level of hydraulic fluid in the first compartments falls below the case drain return port.

20. The method of claim 19, further comprising:
disconnecting the case drain return line after the ceasing step; and
checking for debris in a screen of the case drain return port after the disconnecting step.

* * * * *